United States Patent [19]

Dunne

[11] Patent Number: 5,564,459
[45] Date of Patent: Oct. 15, 1996

[54] FOB DETECTOR

[76] Inventor: Seamus C. Dunne, Anak Kinta, Stepaside, Co. Dublin, Ireland

[21] Appl. No.: 392,184

[22] Filed: Feb. 22, 1995

[51] Int. Cl.⁶ .................................................. F16K 31/18
[52] U.S. Cl. ...................... 137/181; 137/170.2; 137/192; 251/263
[58] Field of Search ................................ 137/170.2, 181, 137/192; 251/263

[56] References Cited

U.S. PATENT DOCUMENTS

| 1,093,325 | 4/1914 | Hagerthey | 137/587 |
| 3,417,962 | 12/1968 | Fuerst | 251/262 |

FOREIGN PATENT DOCUMENTS

| 47813 | 6/1984 | Ireland. | |
| 1357953 | 6/1974 | United Kingdom. | |

OTHER PUBLICATIONS

Instruction leaflet for Gaskell & Chamber's Fob Detector (published prior to Feb. 22, 1994).

*Primary Examiner*—Gerald A. Michalsky
*Attorney, Agent, or Firm*—Parkhurst, Wendel & Burr, L.L.P.

[57] ABSTRACT

A fob detector for use in a supply line between a pressurized beverage container and a dispenser has a vent valve whose valve head is acted upon by pressure inside the chamber of the fob detector and which is operated by a handle which is movable from a rest position to an activated position, such that upon removal of manual pressure from the handle the valve is closed automatically.

6 Claims, 2 Drawing Sheets

FOB DETECTOR

BACKGROUND OF THE INVENTION a) Field of the Invention

This invention relates to a fob detector for use in the supply line between a pressurized beverage container and a dispensing means, particularly for beers.

b) Description of the Related Art

One of the problems encountered when dispensing draught beers, and especially draught stout, occurs when the pressurized container from which the beer is to be dispensed is nearly empty and there is a build up of the fob or froth which constitutes a considerable wastage. Several pints of fob must be cleared from the dispensing system before the next full beer container can be connected to the system. It is known to use a fob detector in the beer line between the container and the dispensing point—see British Patent Specification No. 1,357,953 of Porter-Lancastrian Limited. Irish Patent Specification No. 47813 of the present inventor (the contents of which are incorporated herein by reference) describes apparatus for use in inhibiting dispense of fob comprising a chamber having an inlet aperture for receiving liquid beverage under pressure from a supply source, and an outlet aperture for discharging such liquid beverage to a dispensing means, the outlet aperture being surrounded by a seating, a float movable within the chamber relative to the seating, the float being buoyant in the liquid beverage but not in fob and being arranged to make sealing engagement with the seating when the chamber is empty or substantially empty of liquid beverage, and means to displace the float from the seating. The chamber is provided with a vent communicable with the top of the chamber and closable by a valve unit which is in screw-threaded engagement with the chamber top component. The vent valve is normally kept closed. However upon connection of the device to a fresh supply source, the vent valve is opened manually to release pressure from inside the chamber.

The vent valve as described in Irish Patent Specification No. 47813 is screw-threaded. It has a head inside the chamber which seals against the seating of a valve port. However when the valve has been opened by rotating the knob, it must be closed again after use by counter-rotation of the knob. This gives rise to a serious risk that the valve may be left open by an operator who is handling the changeover of beer kegs, particularly in an urgent situation when beer is in demand. If the valve is left open, part or even all of the contents of the new beer keg may be lost through the vent port and may go to waste.

It has been proposed to use a spring loaded vent valve in which a valve head is lifted upwardly off a valve seat by a cam lever. However this type of valve actuation also gives rise to a risk of the valve being left open.

SUMMARY OF THE INVENTION

The present invention provides a fob detector for use in the supply line between a pressurized beverage container and a dispensing means, comprising (i) a chamber having a liquid inlet aperture for receiving liquid beverage under pressure from the container, a liquid outlet aperture for discharging such liquid to a dispensing means, and a vent aperture for venting gas from the chamber, (ii) a float valve in the chamber for sealing the outlet aperture when the supply of liquid beverage to the chamber is interrupted, and (iii) a vent valve for opening and closing the vent aperture, the vent valve comprising:

(a) a valve seat surrounding the vent aperture and facing towards the chamber, (b) a valve head sealingly engageable against the seat to close the vent aperture, (c) a spring urging the valve head against the seat, (d) manual valve-operating means external of the chamber for moving the valve head out of sealing engagement with the seat, said valve-operating means being movable under manual pressure from a rest position in which the valve is closed to an activated position in which the valve is open but requiring manual pressure to retain said valve-operating means in the activated position, such that upon removal of said manual pressure the valve is automatically closed by the spring and/or by pressure inside the chamber acting on the valve head.

Preferably the means for moving the valve head comprises a valve stem connected at one end to the head, and a manually-operable cam device acting on the other end of the stem, the cam device being configured such that the valve-operating means does not remain in the activated position unless manual pressure is applied thereto.

In the preferred embodiment, the cam device comprises a pivotable vent valve handle having a cam surface which acts on the valve stem during pivoting movement of the handle and a stop which restricts pivoting movement of the handle beyond an angular position in which the valve-operating means will return automatically to the rest position if manual is removed from the handle.

Preferably the valve head is located inside the chamber. In the preferred embodiment, the chamber comprises a main chamber housing the float and an auxiliary chamber connected to the main chamber by a passage, the valve head being located in the auxiliary chamber. Preferably, the spring is also located in the auxiliary chamber. In the preferred embodiment, the passage from the main chamber to the auxiliary chamber is of small cross-section, for example having a diameter not more than about 0.2 inch, particularly in the range of about 0.1 to 0.15 inch. The vent aperture preferably connects to a vent outlet of very small cross-section, for example having a diameter in the range 0.025 to 0.035 inch.

BRIEF DESCRIPTION OF THE DRAWINGS

One embodiment of the invention is illustrated in the accompanying drawings in which.

DESCRIPTION OF THE PREFERRED EMBODIMENT

Figure 1:
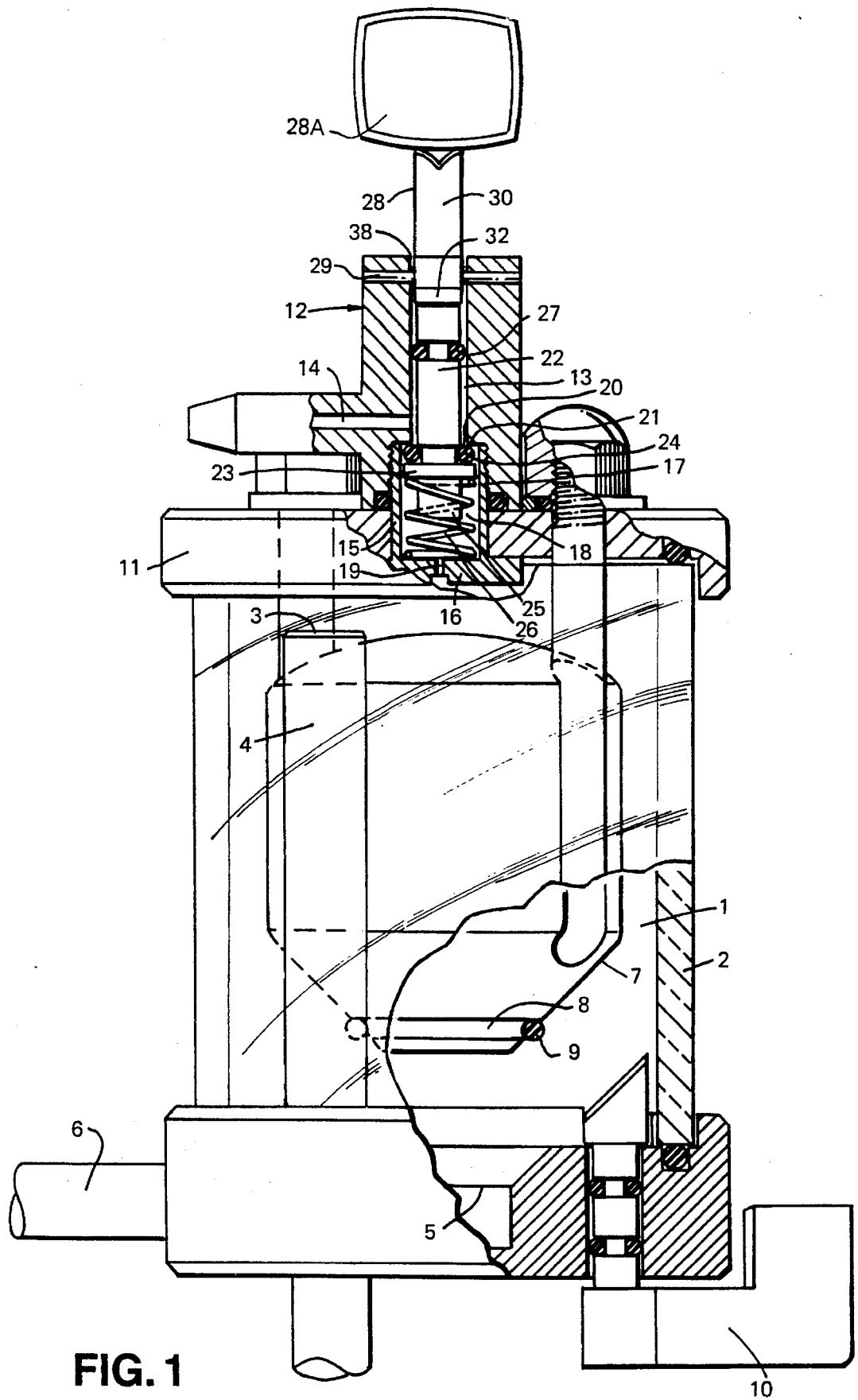
FIG. 1 is a front elevation, partly cut-away to cross-section, of a fob detector according to the invention.

As shown in FIG. 1, the fob detector comprises a cylindrical main chamber 1 enclosed by a wall 2 of transparent material. The inlet aperture 3 is at the top of a vertical inlet pipe 4 extending upwardly through the main chamber. The inlet pipe 4 is connected by a beer line (not shown) to a pressurized beer keg (not shown). The outlet aperture 5 is at the base of the main chamber and connects with a horizontal outlet pipe 6. The outlet pipe 6 is connected by a beer line (not shown) to a dispensing means such as a tap (not shown). The float 7 has a sealing region 8 carrying an O-ring 9 which sits into the outlet aperture 5 when there is not sufficient liquid in the main chamber 1 to keep the float 7 buoyant. A lift handle 10 is provided to lift the float 7 away from the outlet aperture when the main chamber 1 has refilled with liquid.

The top of the main chamber is closed by a top component 11, on which is secured a vent valve unit 12 having an axial bore 13 and a horizontal vent outlet 14 (with a diameter of about 0.030 inch) connected thereto. The top component 11 and the valve unit 12 together define an internally screw-threaded cylindrical wall which receives a hollow retaining member 15 comprising a head 16 and an externally screw-threaded skirt 17. Inside the skirt 17 there is an auxiliary chamber 18 which is connected to the main chamber i by a narrow passage 19 of the order of 0.125 inch diameter and which is connected to the axial bore 13 at the vent aperture 20. The passage 19 is of larger diameter than the vent outlet 14 in order to avoid blockage of the passage 19 by beer. The auxiliary chamber 18 is of larger diameter than the axial bore 13 so that the shoulder formed by the body of the valve unit 12 forms the valve seat 21 around the vent aperture 20.

A valve stem 22 is slidable in the axial bore 13 and extends downwardly into the auxiliary chamber 18 where it carries a valve head 23. The valve head 23 has a diameter slightly less than that of the auxiliary chamber, so that a clearance of about 0.015 inch is provided between the valve head and the internal wall of the skirt 17. An O-ring 24 is installed on a reduced diameter portion of the stem 22 above the valve head. This O-ring 24 seals against the seat 21.

A boss 25 projects below the valve head. A helical spring 26 is mounted around this boss 25 and bears against the valve head 23 and the head 16 of the retaining member 15.

The clearance between the stem 22 and the bore 13 is about 0.015 inch all around. Above the junction between the vent outlet 14 and the bore 13, the stem 22 has a reduced diameter portion carrying an O-ring 27 which seals slidably against the wall of the bore 13.

Figure 2:
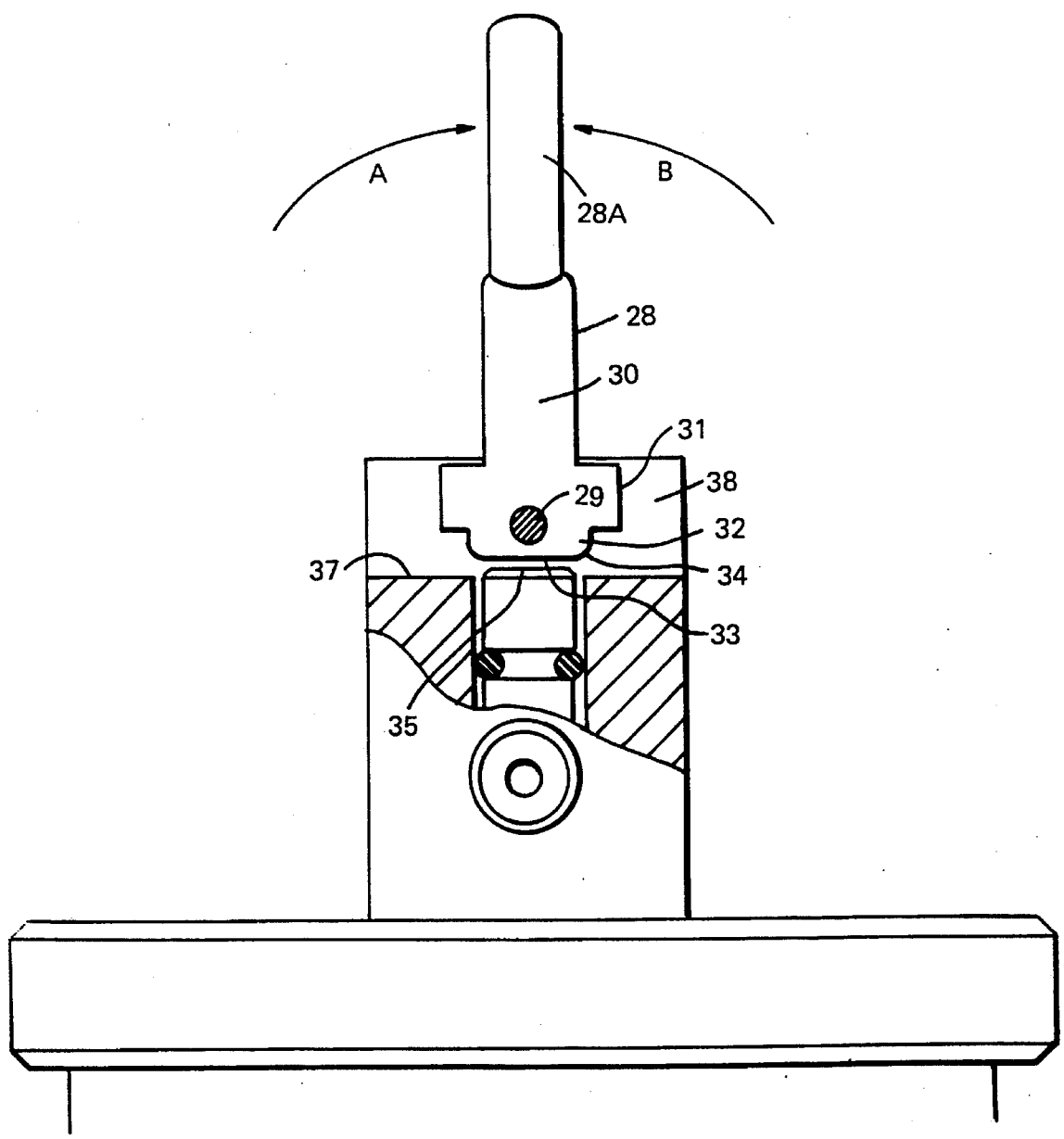
FIG. 2 is a side elevation, partly cut-away to cross-section, of the vent valve operating means in the fob detector of FIG. 1.

As shown in FIG. 2 as well as FIG. 1, the vent valve operating means comprises a handle 28 which is pivotally mounted on a horizontal pivot pin 29 journalled near to the top of the vent valve unit 12 in a recess 37 defined by walls 38 extending diametrically across the unit perpendicular to the pivot pin. The handle 28 is thus restricted to movement to-and-fro (in direction A or B in FIG. 2) and cannot swivel into other orientations. This facilitates reliable use of the vent valve by operators at times of urgency. The handle 28 comprises a gripping portion 28A at the top, a shaft 30, a pair of wings 31 extending horizontally therefrom at right angles to the pivot pin, and an activating portion 32 which has a flat lower surface 33 and a pair of curved cam surfaces 34 on either side of it, the cam surfaces being curved about axes parallel to the pivot pin 29 which passes through the shaft close to the activating portion 32. The flat lower surface 33 is adjacent to the top surface 35 of the valve stem 22 when the device is in its rest position. Manual pressure on the handle (from either direction A or B in FIG. 2) causes it to rotate on the pivot pin and brings one of the curved cam surfaces 34 into contact with the stem, pushing the stem downwardly to unseat the valve head 23. Continued rotation of the handle brings one of the wings 31 into contact with the body of the valve unit at the base of the recess 37. This stops rotation of the handle so that it does not go "over-centre".

When manual pressure is removed from the handle, the spring 26 acting on the valve head 23, combined with pressure inside the main chamber 1 also acting on the valve head in the same direction, causes the valve to close automatically.

During the normal supply of beer from a keg to the dispensing point, the main chamber 1 is full of beer, the float 7 is held up in the liquid so that the outlet aperture 5 is open, and the vent valve is closed. When a keg is almost empty, fob starts to appear through the inlet pipe 4. As the level of liquid in the main chamber falls, the float 7 drops into engagement with the outlet aperture to prevent fob passing through the outlet pipe 6 to the dispensing point.

When a new keg has been connected to the inlet pipe 4, the vent valve is opened by manual pressure on the handle 28 to achieve a partial reduction of pressure in the main chamber 1 e.g., from about 30 to about 20 p.s.i. Due to the extremely small dimensions of the passage 19 and the vent outlet 14, as well as the small clearance around the valve head 23 and stem 22, there is a pressure drop but not an equalisation of pressure. Beer fills the chamber 1 again. When the chamber 1 is full, the manual pressure on the handle 28 is released, which allows the vent valve to close automatically as described above. There is no risk of the vent valve being left open and allowing beer to flow to waste through the vent outlet. The float valve is then unseated by use of the float lift handle 10 and beer flows to the outlet pipe.

When cleaning the fob detector, the vent valve is opened so that the main chamber is vented while it is filling with detergent pumped through the beer lines.

I claim:

1. A fob detector for use in a supply line between a pressurized beverage container and a dispensing means, comprising:

(i) a chamber having a liquid inlet aperture for receiving liquid beverage under pressure from the container, a liquid outlet aperture for discharging such liquid to a dispensing means, and a vent aperture for venting gas from the chamber, (ii) a float valve in the chamber for sealing the outlet aperture when supply of liquid beverage to the chamber is interrupted, and (iii) a vent valve for opening and closing the vent aperture, the vent valve comprising:

(a) a valve seat surrounding the vent aperture and facing the chamber in which pressurized liquid beverage is received, (b) a valve head sealingly engageable against the seat to close the vent aperture, (c) a spring urging the valve head against the seat, (d) a valve stem having first and second ends, the first end of the valve stem being connected to the valve head, (e) manual valve-operating means external of the chamber for moving the valve head out of sealing engagement with the seat, said valve-operating means comprising a pivotable vent valve handle which is movable under manual pressure from a rest position in which the valve is closed to an activated position in which the valve is open, said handle having a cam surface which acts on the second end of the valve stem during pivoting movement of the handle, the cam surface being configured such that the valve-operating means does not remain in the activated position unless manual pressure is applied thereto and such that upon removal of said manual pressure the valve is automatically closed by the spring and by pressure inside the chamber acting on the valve head, a stop being provided to restrict pivoting movement of the handle beyond an angular position from which the valve-operating means will return automatically to the rest position when manual pressure is removed from the handle.

2. A fob detector according to claim 1, wherein the valve head is located inside the chamber.

3. A fob detector according to claim 2, wherein the chamber comprises a main chamber housing the float and an auxiliary chamber connected to the main chamber by a passage, the valve head being located in the auxiliary chamber.

4. A fob detector according to claim 3 wherein the spring is also located in the auxiliary chamber.

5. A fob detector according to claim 3 the passage from the main chamber to the auxiliary chamber is of very small cross-section.

6. A fob detector according to claim 5 wherein the passage has a diameter not more than about 0.2 inch, particularly in the range of about 0.1 to 0.15 inch.

* * * * *

UNITED STATES PATENT AND TRADEMARK OFFICE
CERTIFICATE OF CORRECTION

PATENT NO. : 5,564,459
DATED : October 15, 1996
INVENTOR(S) : Seamus C. Dunne

It is certified that error appears in the above-indentified patent and that said Letters Patent is hereby corrected as shown below:

Column 2, line 34, before "is" insert --pressure--.

Column 3, line 18, change "i" to --1--.

Column 6, line 5, after "3" insert --wherein--.

Signed and Sealed this

Eighth Day of April, 1997

BRUCE LEHMAN

*Attest:*

*Attesting Officer*     *Commissioner of Patents and Trademarks*